United States Patent [19]

Nakamura et al.

[11] Patent Number: 5,343,314
[45] Date of Patent: Aug. 30, 1994

[54] OPTICAL FIBER COMMUNICATION METHOD AND MULTIMEDIA OPTICAL FIBER NETWORK USING THE SAME

[75] Inventors: Kenji Nakamura, Hadano; Masao Majima, Atsugi; Noboru Yamamoto, Fujisawa, all of Japan

[73] Assignee: Canon Kabushiki Kaisha, Tokyo, Japan

[21] Appl. No.: 897,482

[22] Filed: Jun. 12, 1992

Related U.S. Application Data

[62] Division of Ser. No. 415,764, Oct. 2, 1989.

[30] Foreign Application Priority Data

Oct. 4, 1988 [JP] Japan ................ 63-251452
Dec. 16, 1988 [JP] Japan ................ 63-316498
Sep. 18, 1989 [JP] Japan ................ 1-240074

[51] Int. Cl.$^5$ ................................ H04J 14/00
[52] U.S. Cl. ................................ 359/123; 359/128
[58] Field of Search ............ 359/118, 120, 121, 124, 359/125, 128, 135–137, 139, 123; 385/46; 370/50, 57, 58.1, 58.2, 61, 94.3, 60, 60.1, 94.1, 94.2

[56] References Cited

U.S. PATENT DOCUMENTS

| | | | |
|---|---|---|---|
| 4,672,373 | 6/1987 | Mori | 370/86 |
| 4,704,715 | 11/1987 | Shibagaki | 359/125 |
| 5,130,835 | 7/1992 | Stegmeier | 359/124 |
| 5,144,466 | 9/1992 | Nakamura | 359/123 |

*Primary Examiner*—Leslie Pascal
*Attorney, Agent, or Firm*—Fitzpatrick, Cella, Harper & Scinto

[57] ABSTRACT

The present invention discloses an optical fiber communication system for an optical network in which a plurality-of types of communication terminal equipments are connected to one another via optical fibers, the optical fiber communication system, being consisting of the steps: conducting wavelength multiplexing using at least three wavelengths, allotting a first optical wavelength to a packet switched communication of a distribution control system, allotting a second optical wavelength to a line switched communication of a time division multiplexing system, allotting the residual optical wavelength to a line switched communication by an optical, wavelength allotment system, and conducting a control of the line switched communication of the time division multiplexing system using the second optical wavelength and the line switched communication by the optical wavelength allotment using the residual optical wavelength, this control being conducted by using the packet switched communication using the first optical wavelength. The present invention further discloses an optical network having an optical network control unit to which the optical fiber communication system is applied, an optical network having no optical network control unit, a terminal equipment forming the optical network, and an optical network control unit.

76 Claims, 11 Drawing Sheets

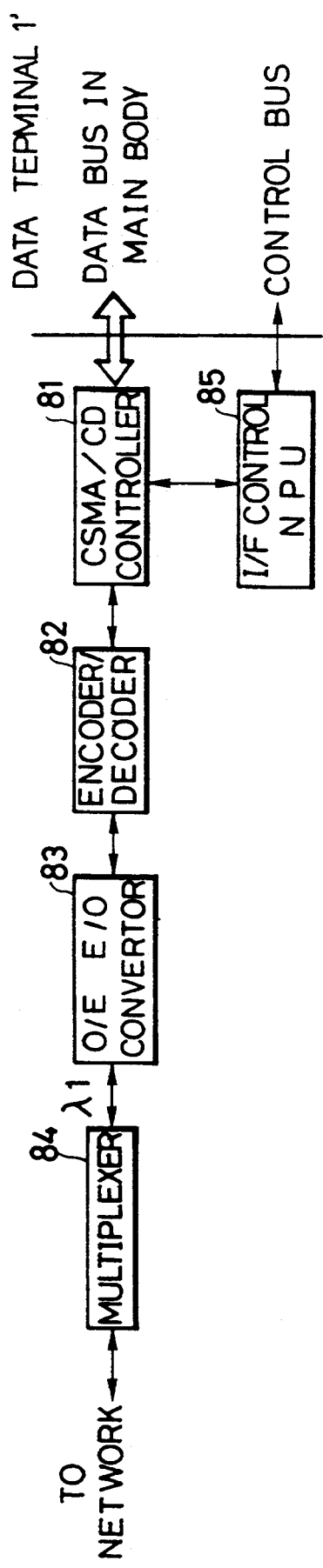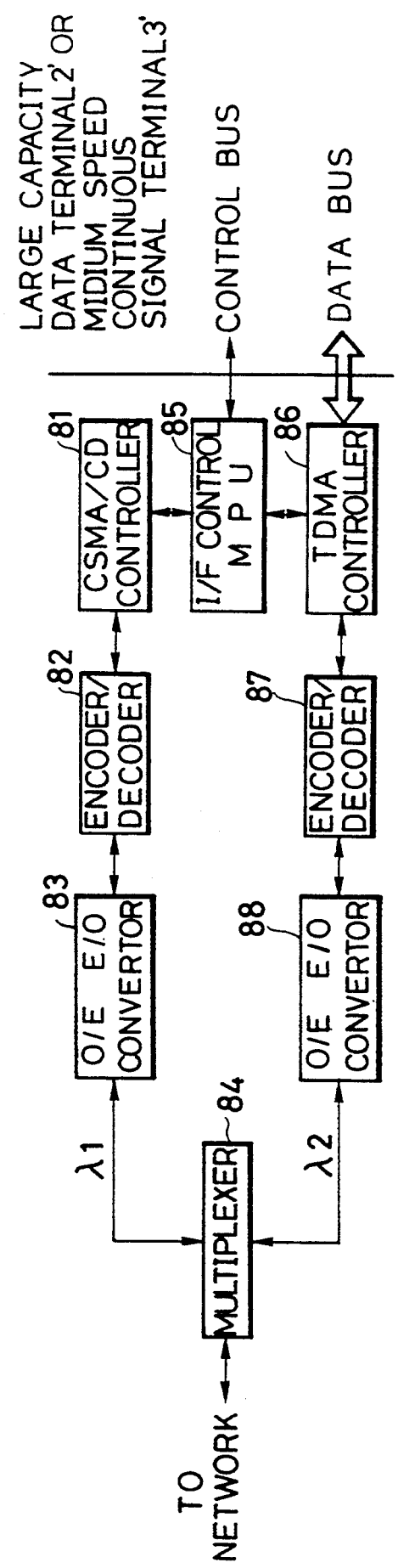
Fig. 6A
Fig. 6B

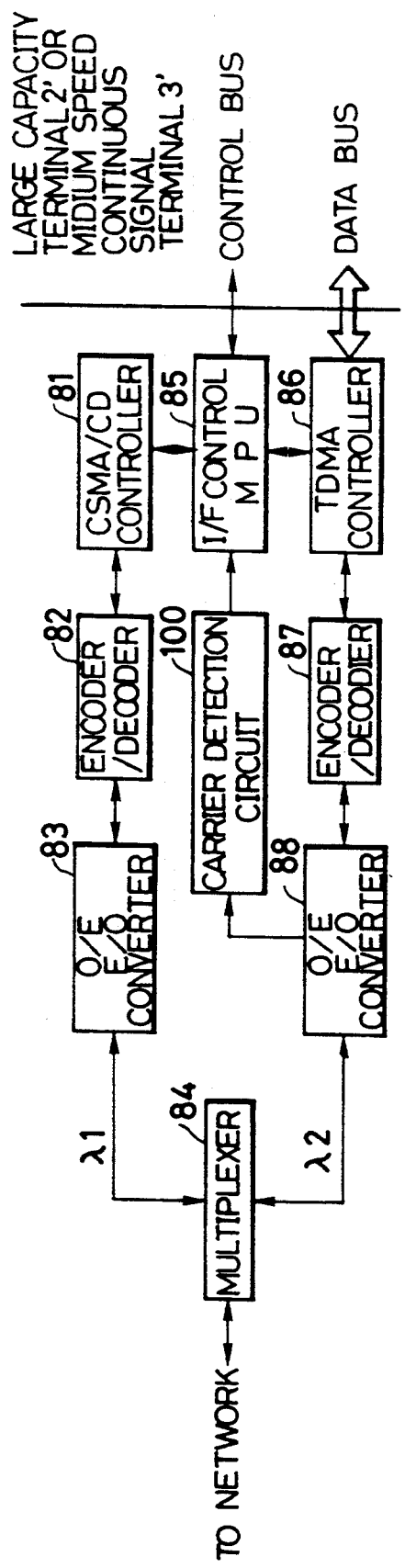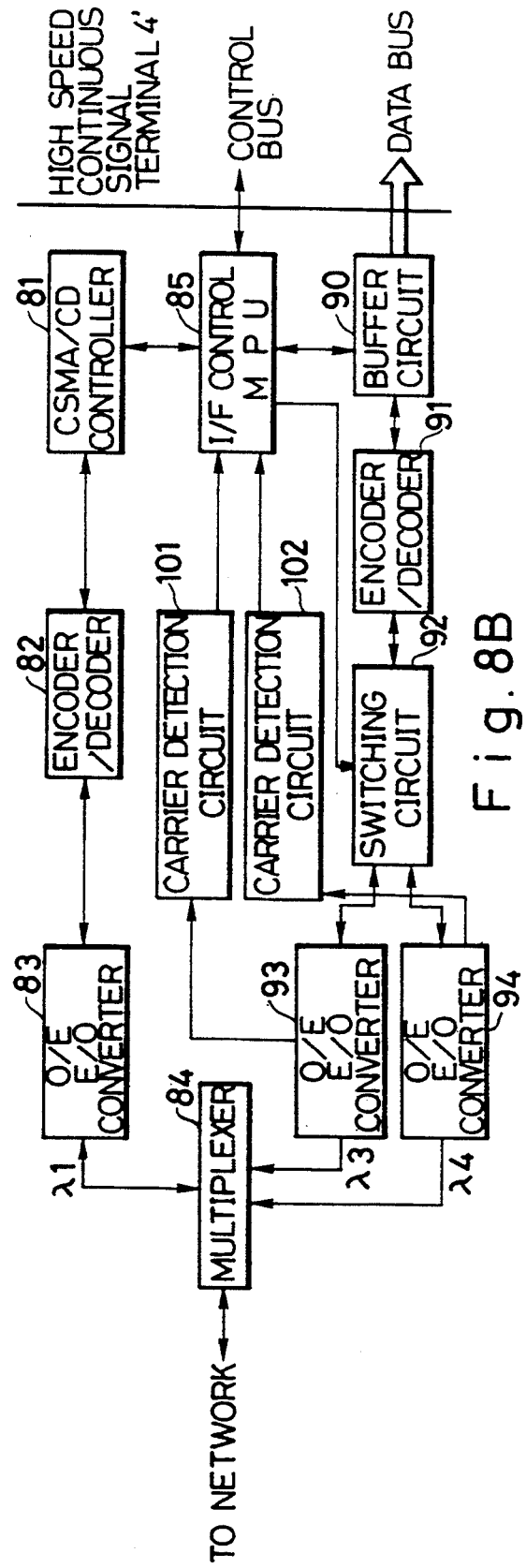
Fig. 8A
Fig. 8B

OPTICAL FIBER COMMUNICATION METHOD AND MULTIMEDIA OPTICAL FIBER NETWORK USING THE SAME

This application is a division of application Ser. No. 07/415,764 filed Oct. 2, 1989.

BACKGROUND OF THE INVENTION

1. Field of the Invention

The present invention relates to an optical fiber communication method, and, more particularly, to an optical fiber communication method using optical wavelength multiplexing and a multimedia optical fiber network using the same.

2. Related Arts

Recently, information subjected to the communication in offices has been varied significantly. For example, various signals are used in a mixed manner in offices, the signals being data signals in computers and work stations, still-image signals in facsimiles, voice signals of telephones, and image signals of video conference systems. However, each of the signals is arranged to be transmitted at an individual transmission speed and to have an individual transmissible capacity and the continuity. On the other hand, information to be transmitted has been needed to have a large capacity and to correspond to a high speed transmission since the terminal equipments which use the information have been in a trend toward high performance. In accordance with the rapid progress of the information-oriented society, networks have been needed to have performance enabling to transmit signals each having individual transmission speed, transmissible capacity, and continuity through the same transmission medium, that is, performance to correspond to multimedia and high speed processing is needed. To this end, optical fiber networks have been employed recently as a preferred network which can meet the desires. In this description, the difference in the signal continuity means the difference between signals (to be called "continuous signals" hereinafter) such as voice signals and video signals which cannot be interrupted during the transmission and signals (to be called "data signals" hereinafter) such as data for computers which does not arise any problem even if they are transmitted with interruptions interposed.

In general, a carrier sense multiple access/collision detection (to be abbreviated to "CSMA/CD" hereinafter) system, a token passing system, and a time division multiple access (to be abbreviated to "TDMA") system are available as the signal access system for the optical fiber network. The TDMA is usually employed in order to correspond to multimedia. The reason for this lies in that the CSMA/CD and the token passing are originally arranged to be used in a packet switched communication which is suitable for transmitting data signals, causing a complicated means (a priority-addition means or delay-prevention means) to be provided for the packet control in order to maintain the continuity of the signals at the receipt terminals when signals such as voice signals and video signals which are necessary to have continuity are processed. Furthermore, the CSMA/CD and the token passing involve a large number of limitations.

On the other hand, the TDMA is an access arranged such that a signal from each of the terminal equipments is allotted to the time slot in the frame so as to be compressed on the time axis. Therefore, continuous signals can be readily treated and the limitations can be reduced. Although there are various systems classified on the basis of the way of allotting the time slots, a variable allocation system is widely used, the variable allocation system being arranged such that the time slots are allotted to each of the terminal equipments by a control unit of the network. As a method to correspond to multimedia using the TDMA, there is a method that is arranged such that a portion of the time slots in the frame are allotted to the packet switching which is capable of transmitting burst signals, the remainder being then allotted to the line switching which is capable of transmitting continuous signals.

However, the optical network using the TDMA and capable of corresponding multimedia encounters the following problems: since the TDMA multiplexes the signal from each of the terminal equipments in a time sequential manner, that is, it compresses the signals on the time axis, the transmission speed on the network becomes higher than that of the signal to be transmitted from each of the terminal equipments and a limitation arises that a signal having individual speed from each of the terminals needs to be converted into the same transmission speed before the signals are transmitted to the network. That is, the transmission speed on the network is necessary to be the product of speed at the terminal which displays the highest transmission speed and the number of the multiplexings assumed for the terminal. Furthermore, the terminal displaying the lowest transmission speed is needed to time-compress the signal to the transmission speed on the network before the signal transmission.

Assuming that a multimedia network is established by substantially 10 terminals each of which is arranged to be a transmission speed of several tens of kbps and substantially 10 terminals each of which is arranged to be a transmission speed of several hundred Mbps, a transmission speed of several Gbps is necessary for the network to be established. Furthermore, the terminals each of which is arranged to be the transmission speed of several tens of Kbps are respectively necessary to be provided with a communication device for the purpose of time-compressing the signal to the transmission speed on the network, that is, to several Gbps.

However, it is difficult in terms of the technical viewpoint to establish the network arranged to be the transmission speed of the above-described level. If it can be established, the cost becomes excessive. Furthermore, the low speed terminals whose cost needs to be reduced are necessary to be respectively provided with a high speed communication system which is an expensive device for the purpose of establishing a connection with the network, causing the establishment of the network to become impossible. In addition, the TDMA system in which the above-described complicated control is necessary is needed to be provided with a unit for controlling the network. Therefore, such a system is disadvantageous in terms of the cost, and a problem of limitation of the capability of extensibility also arises.

SUMMARY OF THE INVENTION

In order to overcome the above-described problems encountered with the conventional systems, an object of the present invention is to provide an optical fiber communication method capable of realizing a network which can correspond to multimedia by using optical wavelength multiplexing.

Another object of the invention is to provide an optical fiber communication method in an optical network established by connecting a plurality of types of communication terminal equipments with optical fibers, the optical fiber communication system comprising the steps of:
- conducting a wavelength multiplexing using at least three optical wavelengths;
- allotting a first optical wavelength to a packet switching communication of a distribution control system;
- allotting a second optical wavelength to a circuit switching communication of a time division multiplexing system;
- allotting a residual optical wavelength to a circuit switching communication of an optical length allotment system,
- wherein an optical network control unit connected to the optical network controls the circuit switching communication of the time division multiplexing system in which the second optical wavelength is used and the circuit switching communication of the optical length allotment system in which the residual optical wavelength is used, the control being conducted by the packet switching communication in which the first optical wavelength is used and which is established with each of the terminal equipments.

A still another object of the invention is to provide an optical fiber communication method for an optical network including no optical network control unit and capable of conducting a communication of a signal between a plurality of terminals, the optical fiber communication system comprising the steps of:
- conducting a multiplexing of at least three optical wavelengths;
- conducting a packet communication of a signal which is not necessary to have a continuity by using a first wavelength;
- conducting a time division multiplexing communication by using a second wavelength;
- conducting a communication of high speed continuous signals by using a residual wavelength,
- wherein a control of wavelengths other than the first wavelength is conducted in a distributed manner by the packet communication between the terminals in which the first wavelength is used.

A further object of the invention is to provide a multimedia optical fiber network to which the optical fiber communication system is applied and which includes an optical network control unit and to provide a multimedia optical fiber network including no optical network control unit.

The optical fiber network can be arranged to be in the form of a passive bus type in which passive type optical couplers are employed, a passive star type, an active star type, or a bus type in which optical amplifiers are provided.

A still further object of the invention is to provide an optical network control unit forming the above-described multimedia optical fiber network, a communication interface, and an terminal equipment.

As a result, the problems of technical difficulty and cost encountered in the TDMA multimedia optical network in which the transmission speed on the network has been raised can be overcome. The cost of the terminals whose arranged speed is at a low speed can be reduced and a necessity of the controlling of the network can be eliminated. Therefore, a high performance optical fiber network capable of corresponding to a variety of multimedia and displaying a satisfactory extensibility can be realized only with a reduced cost.

Other and further objects and advantages of the invention will appear more fully from the following description taken in connection with the accompanying drawings.

BRIEF DESCRIPTION OF THE DRAWINGS

FIGS. 6A to 6D are block diagrams of communication interfaces in the structure shown in FIG. 5;

FIGS. 8A and 8B are block diagrams which illustrate another structure of the communication interfaces;

DESCRIPTION OF PREFERRED EMBODIMENTS

The present invention will now be described in detail with reference to embodiments.
Star type optical network including an optical network control unit Then, the structure of a first embodiment of an optical network according to the present invention will be described.

The optical network according to this embodiment uses at least three light wavelengths, where one of the three wavelengths is allotted to a packet switching communication of burst signals (to be called "a first system" hereinafter), another one is allotted to a time division multiplexing circuit switching communication of continuous signals (to be called "a second system" hereinafter), and the remainder is allotted to a circuit switching communication of high speed continuous signals (to be called "a third system" hereinafter).

The first system is of a distribution control type system capable of transmitting burst data signals for terminal equipments or the like and communication control signals of the second and third systems. The second system conducts the circuit switching communication of continuous signals and sometimes conducts the same of large capacity data signals, wherein a plurality of lines are secured by TDMA. The third system conducts the circuit switching communication of high speed continuous signals. If a plurality of lines are necessary in the third system, the lines can be secured by increasing the number of the optical wavelengths. The control of the communication in the second and third systems such as line allotment is conducted by a unit for controlling the optical network, the unit being connected to this optical network.

The communication interfaces respectively comprise at least a transmitter-receiver corresponding to the first system whereby the transmitter-receiver corresponding to the necessary system can be selected in accordance with the terminal equipment connected to the communication interface. Furthermore, the optical network control unit comprises a transmitter-receiver for the first and second systems and a receiver for the third system.

Figure 1:
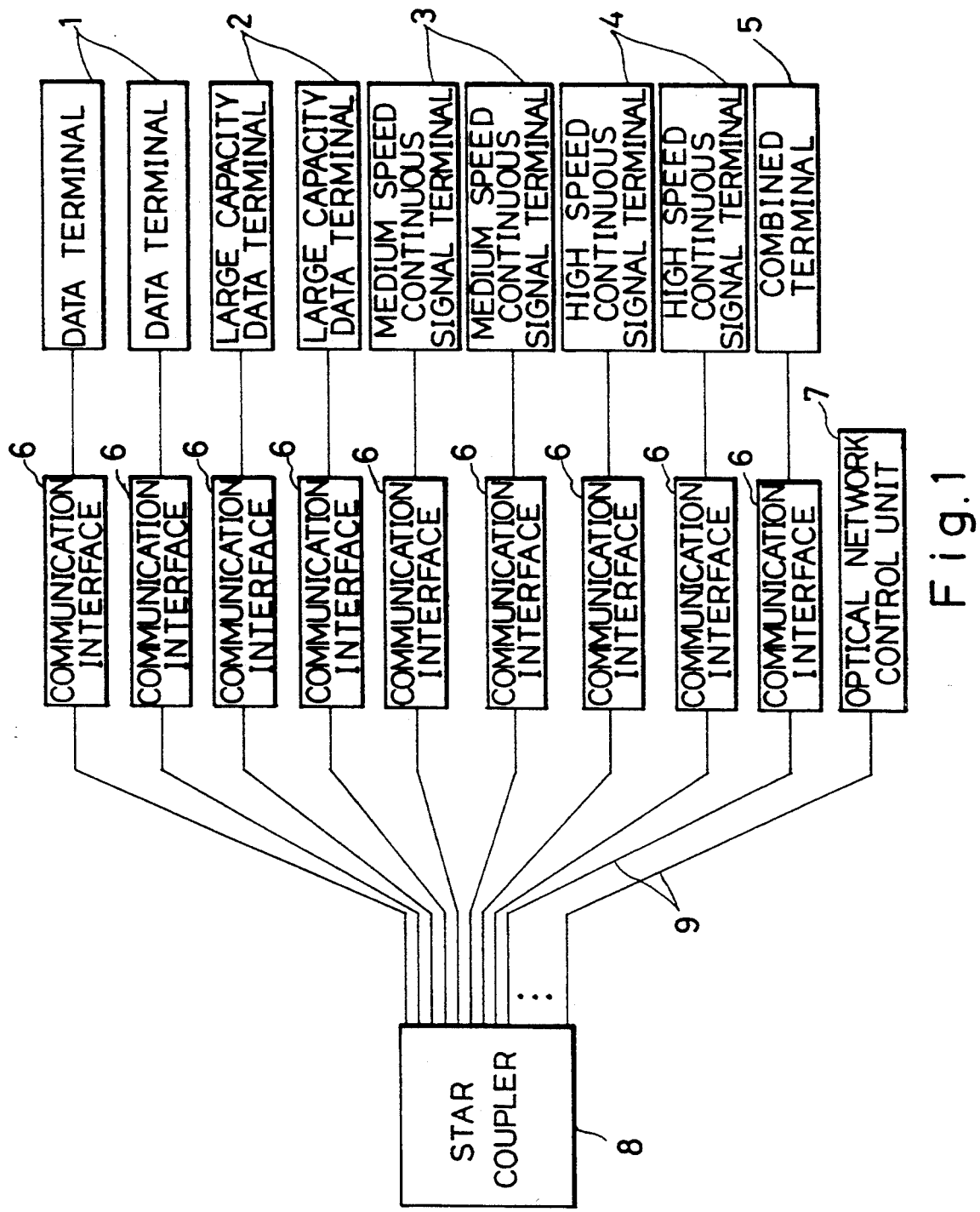
FIG. 1 is a view which illustrates the structure of a multimedia optical network according to an embodiment of the present invention.

FIG. 1 is a view which illustrates an embodiment of the optical network system according to the present invention, the optical network system being capable of corresponding to multimedia. This optical network system comprises: data terminal equipments 1; large-capacity data terminals 2; medium speed continuous signal terminals 3 which correspond to, for example, quality acoustic devices; high speed continuous signal terminals 4 which correspond to, for example, image devices; combined terminal devices 5 which combine the former terminals; an optical network control unit 7 capable of controlling the transmission passage; a star coupler 8, and optical fibers 9.

The terminal equipments are respectively connected to the corresponding communication interfaces 6, the communication interfaces 6 and the optical network control unit 7 respectively being connected to a passive star coupler 8 by one optical fiber 9. On the network, the signals for the three systems are multiplexed by the optical wavelength multiplexing. It is assumed that the optical wavelengths to be respectively allotted to the first, the second, and the third systems are $\lambda_1$, $\lambda_2$, and $\lambda_3$. The first system enables the packet communication of the data terminal equipment to be conducted and also acts to control the communication between the other terminal equipments and the network, where the access to which is controlled by CSMA/CD. The second system treats large capacity data and medium-speed continuous signals, the second system multiplexing 10 lines by means of the TDMA thereof. The third system processes high-speed continuous signals, the third system being arranged, according to this embodiment, that the optical wavelength multiplexing is not conducted whereby only one line is secured by one optical wavelength $\lambda_3$.

Figure 2:
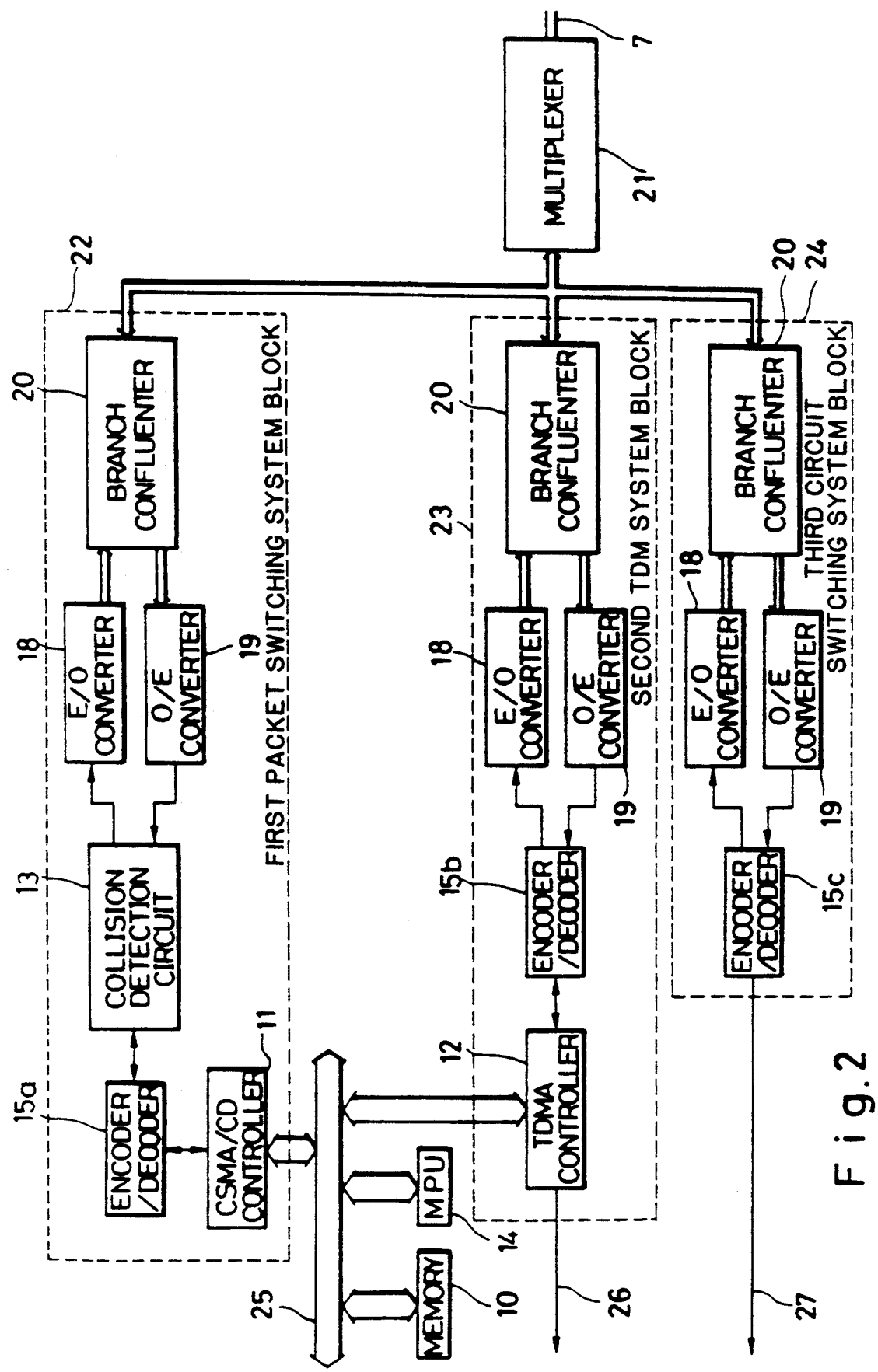
FIG. 2 is a block diagram of communication interfaces in the structure shown in FIG. 1.

FIG. 2 is a view which illustrates an example of a block diagram for use in the communication interface 6 in the system according to this embodiment. Referring to FIG. 2, reference numerals 22, 23, and 24 respectively represent block diagrams for the first packet switching, second time division multiplex, and third circuit switching systems.

The first-system block 22 comprises, a CSMA/CD controller 11, an encoder-decoder 15a, a collision detection circuit 13, an E/O converter 18, an O/E converter 19, and a branch confluenter 20, whereby information supplied from data bus 25 of the terminal equipment and stored in a memory 10 is, under the control performed by an MPU 14, transmitted to the CSMA/CD controller 11. The thus-transmitted information is packetted in the CSMA/CD controller 11, is then encoded by the encoder-decoder 15a before being E/O-converted by the E/O converter 18. The thus E/O-converted information is transmitted to the optical fiber 9 after it has passed through the branch confluenter 20 and a multiplexer 21.

The second-system block 23 comprises a TDMA controller 12, and encoder-decoder 15b, the E/O converter 18, the O/E converter 19, and the branch confluenter 20, whereby a signal from an I/O 26 such as large capacity data or medium speed continuous signal is, under the control performed by the MPU 14, compressed in one time slot, the thus compressed signal being then transmitted to the optical fiber 9 in the similar manner to that in the first-system block 22.

The third-system block 24 comprises an encoder-decoder 15c, the E/O converter 18, the O/E converter 19, and the branch confluenter 20, whereby high-speed continuous signals supplied through an I/O 27 are directly encoded, the thus encoded high-speed continuous signals being then transmitted to the optical fiber 9 in the similar manner to that in the other systems.

On the contrary, the receipt of the signals is conducted in the reversed manner to the above-described manner.

The light-emitting wavelength in the E/O converter 18 and selected optical wavelength at the time of conducting the branching by the multiplexer 21 is $\lambda_1$ in the first-system block 22, the same in the second-system block 23 is $\lambda_2$, and the same in the third-system block 24 is $\lambda_3$.

It is understood that by replacing the multiplexer 21 with a branch confluenter and the branch confluenter 20 with a multiplexer, there is no change of function and capacity.

As described above, the operation of the communication interface 6 for the terminal equipment is conducted, the communication interface 6 combining the data signal, the large capacity data, the medium speed continuous signal, and the high-speed continuous signal. A communication interface which is arranged to correspond to the data terminal equipment does not need the second-system block 23 and the third-system block 24. A communication interface which is arranged to correspond to the large-capacity data terminal equipment and the same which is arranged to correspond to the medium speed continuous signal do not need the third-system block 24. Similarly, a communication interface for the high-speed continuous signal terminal equipment does not need the second system block 23.

Figure 3:
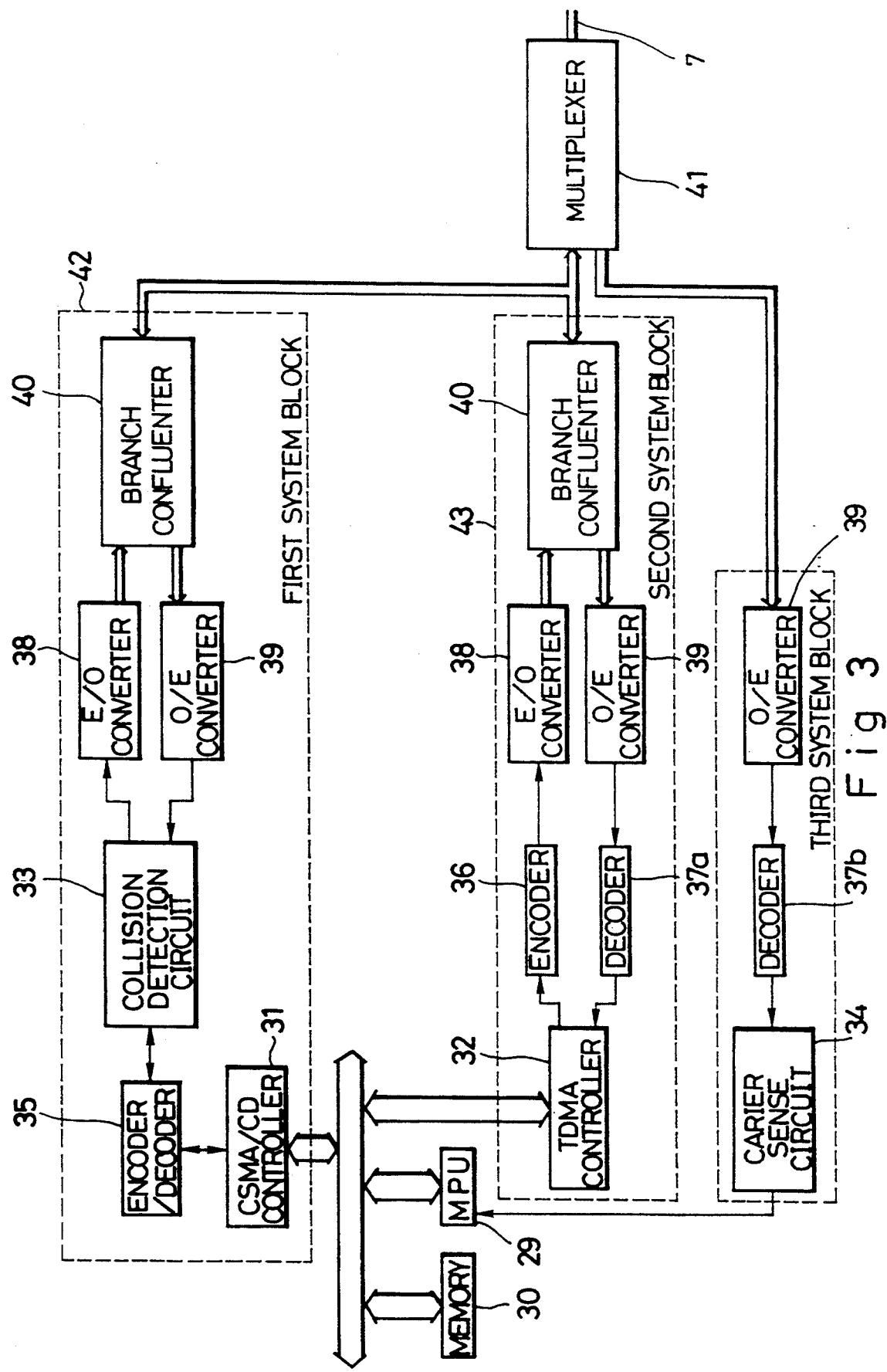
FIG. 3 is a block diagram of an optical network control unit for use in the structure shown in FIG. 1.

FIG. 3 is a block diagram of the optical network control unit 7 for use in the system according to this embodiment, the optical network control unit 7 being capable of controlling the TDMA of the second-system block 23 and controlling the lines in the third-system block 24.

The first-system block 42 comprises a CSMA/CD controller 31, an encoder-decoder 35, a collision detection circuit 33, an E/O converter 38, an O/E converter 39, and a branch confluenter 40, the first-system block 42 being structured similarly to the structure of the communication interface. The second-system block 43 comprises a TDMA controller 32, an encoder 36, a decoder 37a, the E/O converter 38, the O/E converter 39, and the branch confluenter 40, the TDMA controller 32 comprising an internal system clock generating circuit so that signals for conducting a time division are always transmitted to the network through the E/O converter 38. The TDMA controller 32 is further capable of confirming whether or not any signal is present in the time slot. The third-system block 44 comprises a carrier sense circuit 34, a decoder 37b, and the O/E converter 39, the third-system block 44 being necessary to be provided with the receipt system with which a signal from the decoder 37 is received by the MPU 29 so that a fact whether or not any signal is present in the transmission passage is confirmed.

Figure 4A:
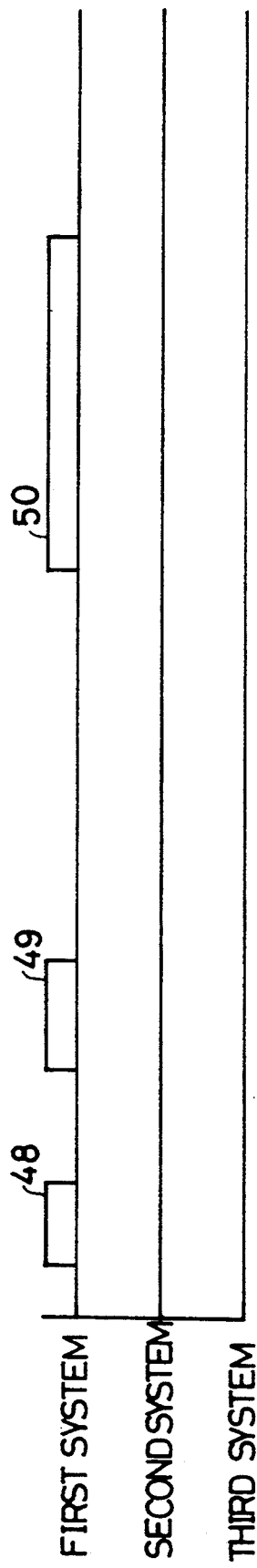
FIG. 4A is a view which illustrates a communication conducted in the first system in the structure shown in FIG. 1.
Figure 4B:
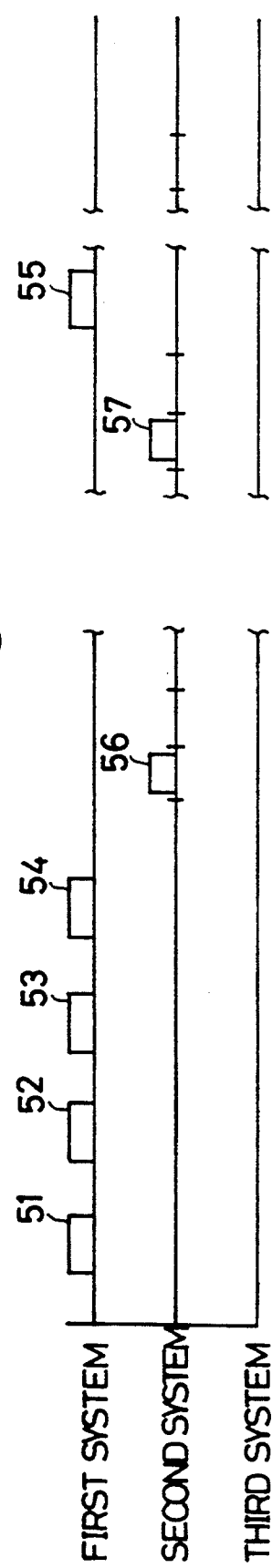
FIG. 4B is a view which illustrates a communication conducted in the second system in the structure shown in FIG. 1.
Figure 4C:
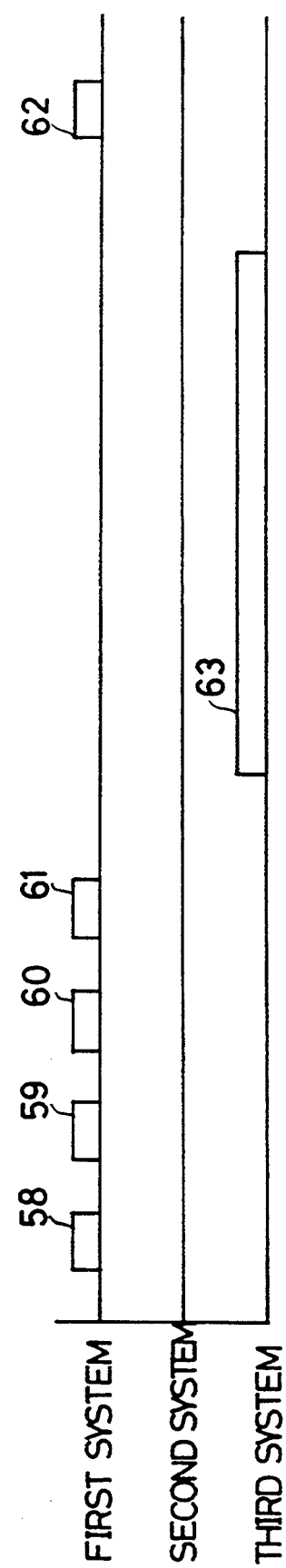
FIG. 4C is a view which illustrates a communication conducted in the third system in the structure shown in FIG. 1.

FIGS. 4A to 4C are views which illustrate an example of the communicating operation of the system according to the present invention.

FIG. 4A is a view which illustrates a case in which the communication is conducted in the first system. Referring to the drawing, the axis of abscissa stands for time, while rectangular frames stand for the signals. The first system is arranged in accordance with IEEE802, 3 (transmission speed: 10 Mbps, access method: CSMA/CD) so that variable-length packets 48, 49, and 50 are transmitted. Therefore, data signals and a control signal for the terminal equipment, and a control signal for the lines for the second and third systems are transmitted with the above-described packets.

FIG. 4B is a view which illustrates a case of the communication conducted in the second system. The second system is arranged such that the transmission speed is 40 Mbps and the access method is the TDMA, the second system being thereby capable of securing ten 4-Mbps lines through which large capacity data or medium speed continuous signal can be transmitted. As countermeasure taken against the delay in the signal transmission in the system, the width of the time slot is arranged to be 12.5 $\mu$sec and the frame frequency is arranged to be 8 kHz. Then, a case will be described in which a high quality acoustic signal is transmitted from a high quality acoustic device A (to be called "a source A" hereinafter) to a high quality acoustic device B (to e called "a destination B" hereinafter).

The confirmation of the state of the destination B and the securing of the lines for the second system are conducted by the first system prior to the communication performed by the second system. Referring to FIG. 4B, reference numeral 51 represents a transmission communication packet for the second system from the source A to the destination B. Reference numeral 52 represents a receivable communication packet for the second system from the destination B to the source A, the receivable communication packet 52 serving as a response to the transmission communication packet 51. Reference numeral 53 represents a line-requiring packet from the source A to the optical network control unit 7, and reference numeral 54 represents a line-allotting packet for the second system from the optical network control unit 7 to the source A and the destination B, the line-allotting packet 54 serving as a response to the line-requiring packet 53.

After the completion of the above-described procedure, the source A transmits high quality acoustic signals 56 and 57 to the second-system line which has been allotted, that is, the time slot. The destination B takes in the signal in the time slot. Since the high quality acoustic signals are in the form of continuous signals, the communication is conducted in a multiplicity of the frames.

After the completion of the communication, the source A transmits a line-release packet 55 for the second system to the optical network control unit 7 and the destination B of the first system, whereby the optical network control unit 7 which has received this line-release packet 55 releases the subject line, and the destination B recognizes the completion of the communication.

FIG. 4C is a view which illustrates a case of the communication conducted in the third system. The third system transmits a high speed continuous signal such as a video signal at a transmission speed of 100 Mbps. The procedure of the communication is conducted in the same manner as that arranged for the transmission communication packet for the second system. Referring to the drawing, reference numeral 58 represents a transmission communication packet for the third system, 59 represents a receivable communication packet for the third system, 60 represents a line-requiring packet for the third system, 61 represents line-allotting packet for the third system, 62 represents line-release packet for the third system, and 63 represents a video signal.

Although this embodiment is arranged in such a manner that the transmission speed in the second system is 40 Mbps and that in the third system is 100 Mbps, the transmission speed may be arranged to be the other speed for the purpose of corresponding to the speed of the signal in the device to be connected. Furthermore, it is not necessary for the transmission speed in the first system to be 10 Mbps.

According to this embodiment, the passive star type network is employed in which the signals from the various system are allotted to the corresponding optical wavelengths and the system of the lowest speed is used to control the network. Therefore, the communication interface needs to be provided only with the transmitter-receiver of the system which corresponds to the terminal equipment to be connected thereto. As a result, the load which is involved to be applied to the electronic circuit in the communication interface can be reduced. As a result, the cost of the electron circuit of the communication interface can be reduced.

Although the optical network may be of the bus-type or star-type, the effect of this embodiment can be displayed by a network arranged such that the communication interface thereof comprises a receiving type optical coupler, the receiving type optical coupler being arranged that it does not conduct neither reproduction nor relay of the signals.

Although the above-described embodiment is structured such that the form of the network is arranged to be of the passive star type, an active star type or a passive bus type may be employed. The passive bus type network is disadvantageous in the limitation of the number of the communication interfaces to be connected since light in the transmission passage is damped due to the branch of light in the optical coupler of node connected with each of the communication interfaces. However, the number of the communication interfaces can be increased by way of employing nodes using optical amplifiers. In this case, the optical fiber communication system according to this embodiment can be employed. Furthermore, al though the case in which the third system is arranged to comprise a line to correspond to one optical wavelength is described in detail, a plurality of lines can, of course, be secured by way of conducting a multiplexing by using the other optical wavelengths.

As described above and according to this embodiment, an optical fiber communication system using optical wavelength multiplexing with which a network capable of corresponding to multimedia can be established can be provided. That is, the allotting of signals utilizing the optical wavelength multiplexing is conducted in the optical network where no reproduction and no relay of signals is conducted in each of the communication interfaces thereof, the signal allotting being capable of corresponding to the multimedia. As a result, the structure only needs to be arranged such that the terminal equipment to be connected to the communication interface is provided with an electronic circuit which corresponds to the signal speed. Therefore, the load to be applied to the electronic circuit due to the communication interface can be reduced, causing the cost to be reduced.

Bus type network provided with no optical network control unit

Then, the optical network according to a second embodiment of the present invention will be described in detail with reference to FIGS. 5 to 8.

Figure 5:
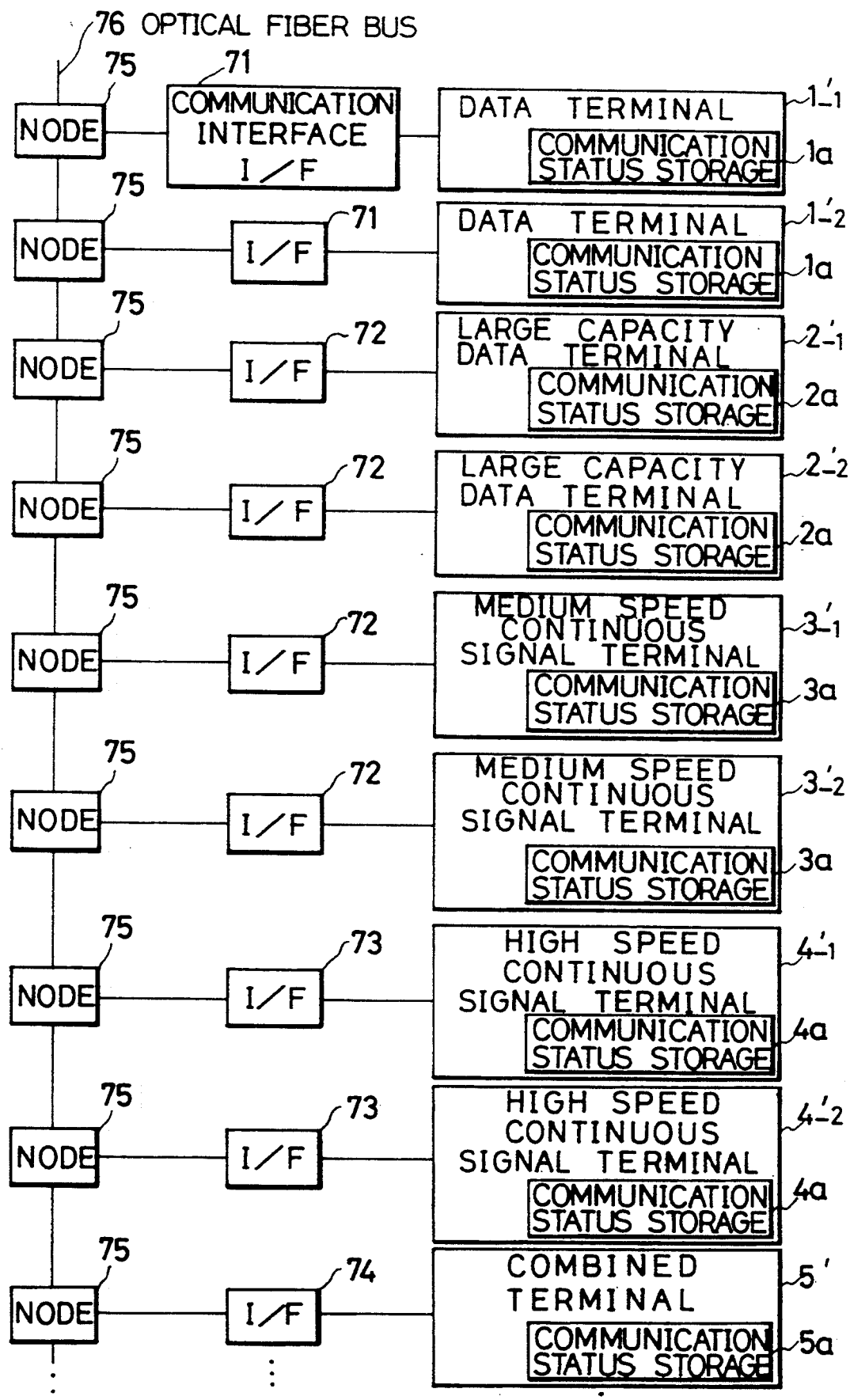
FIG. 5 is a view which illustrates the structure of a second embodiment of the multimedia optical network according to the present invention.

FIG. 5 is a schematic view which illustrates the overall body of the system of the multimedia optical network according to the second embodiment of the present invention. FIGS. 6A to 6D are block diagrams for the communication interfaces capable of conducting the communication in the system of the multimedia optical network according to the second embodiment of the present invention. FIG. 7 is a schematic timing chart for the communication conducted in the system shown in FIG. 5.

FIG. 5 is a structural view which illustrates the concept of a communication network called "a bus-type optical fiber network" where reference numerals 1' to 5' represent terminals to be connected to the network, 71 to 74 represent communication interfaces capable of transmitting/receiving signals between the terminal equipments and the network, 75 represents nodes, and 76 represents an optical fiber bus.

Similarly to the first embodiment, the terminals 1' are capable of transmitting/receiving a so-called data signal of a personal computer or the like, the terminals 1' transmitting and receiving, according to this embodiment, a signal of a speed of 10 Mbps or lower which does not need continuity. The terminals 1' of this type are called "data terminals" hereinafter.

The terminals 2' are capable of transmitting/receiving data of a large capacity such as that for a work station, image file, graphic printer, the terminals 2' transmitting and receiving data signal of a large capacity. The terminals 2' of this type are called "large-capacity data terminals" hereinafter.

The terminals 3' are the terminals such as compact disk players, digital audio players, and tape recorders where digital signals of a continuity of several Mbps are transmitted/received. The terminals of this type are called "medium speed continuous signals terminals" hereinafter.

The terminals 4' are devices such as TVs or VTRs capable of treating video signals where digital signals of about 100 Mbps are transmitted/received. The terminals of this type are called "high speed continuous signal terminals" hereinafter.

The terminal 5' is a terminal which is formed by combining the above-described terminals.

The communication interfaces 71 to 74 are interface circuits each having a function which can suitably correspond to each of the terminals, the function being branch confluenting optical/electric conversion (O/E conversion, E/O conversion), and the controlling of the network which will be described later. The terminals 1' to 5' according to this embodiment, different from the terminals 1 to 5 according to the first embodiment, comprises storages 1a to 5a capable of storing the state of the communication passage forming the network.

The nodes 75 are optical couplers capable of transmitting a portion of optical signal power transmitted through the optical fiber bus 76 to the communication interfaces 71 to 74 or coupling optical signals transmitted from the communication interfaces 71 to 74 to the optical fiber bus 76.

As described later, four optical signals which have been optical-wavelength multiplexed are transmitted to the optical fiber bus 76, the four optical signals being: first wavelength $\lambda_1$ with which data signals can be transmitted; second wavelength $\lambda_2$ with which signals formed by multiplexing the medium speed continuous signals by TDMA method, the third and fourth wavelengths $\lambda_3$ and $\lambda_4$ with which high speed continuous signals can be transmitted.

Figure 6C:
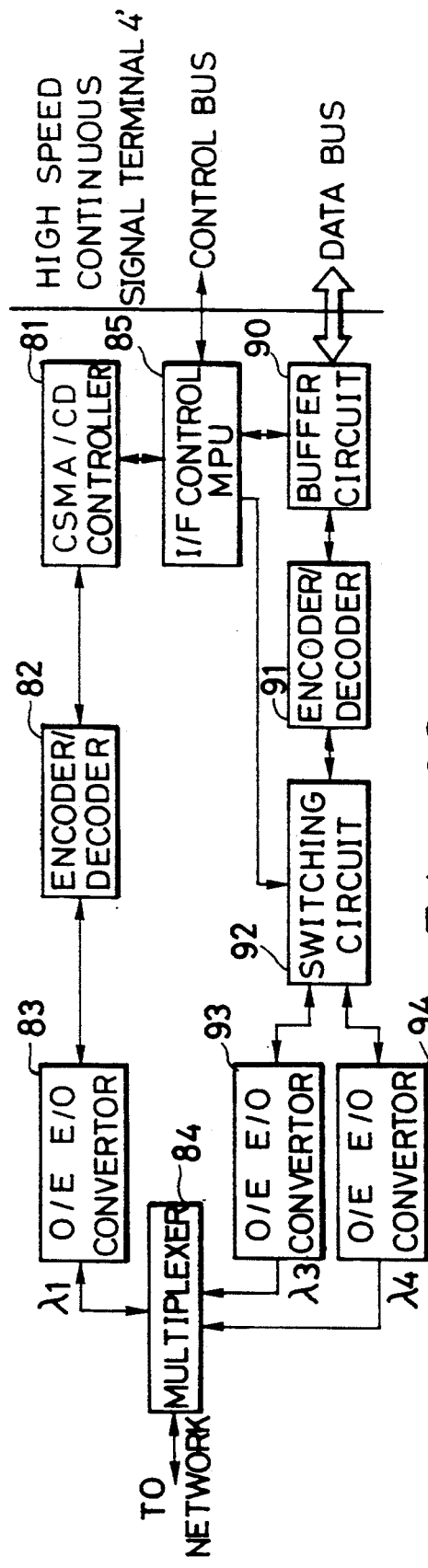

FIG. 6A is a block diagram for the communication interface 71 which can be preferably correspond to the data terminals 1. According to this embodiment, data signals are transmitted by CSMA/CD multiplexing in accordance with IEEE802, 3 standard. The blocks shown in FIGS. 6A to 6D and having the same function are given the same reference numerals.

A I/F control MPU 85 confirms a fact that wavelength $\lambda_1$ is not being used on the transmission passage, that is, on the optical fiber bus 76 through a CSMA/CD control circuit 81 when it receives a demand of the transmission of a data signal from the data terminal 1' and informs that to the data terminal 1'. The data terminal 1' sends the data signal to the CSMA/CD control circuit via data bus in response to the information from the I/F control MPU 85. Then, an encoder/decoder 82 converts the required signal into a transmission passage code and an O/E, E/O circuit 83 converts the transmission passage code into an optical signal having an wavelength of $\lambda_1$ so that the optical signal having an wavelength of $\lambda_1$ is transmitted to the network. When a signal has been transmitted from the network to the data terminal 1', the data signal is transmitted to the data terminal 1' after the data signal has been subjected to the processing arranged in a reversed manner to that described above. Since light having an wavelength other than $\lambda_1$ has been transmitted to the network at this time, only the light having wavelength $\lambda_1$ is selected by a multiplexer 84.

The CSMA/CD control circuit 81 has two functions: a function capable of detecting a collision during the transmission of a signal by the terminal connected thereto; and a function with which the transmission of wavelength $\lambda_1$ from the terminal 1' is retained when wavelength $\lambda_1$ is being used although the transmission of the wavelength $\lambda_1$ is required by the terminal 1'.

FIG. 6B is a block diagram for the communication interface 72 which can preferably correspond to the large-capacity data terminal 2' or the medium speed continuous signal 3. It is assumed that, as described above, wavelength $\lambda_1$ has been multiplexed in the TDMA method and the same has an transmission speed of 40 Mbps for the purpose of transmitting, for example, signals of 4 Mbps through 10 channels. At this time, time slots numbered from 0 to 9 are repeatedly transmitted through the passage through which wavelength $\lambda_2$ is transmitted. The terminal conducting the communication in which wavelength $\lambda_2$ is used transmits a signal to a time slot of a specified number of the ten time slots. As a result, the medium speed continuous signal terminals 3' are enabled to transmit signals at a constant time interval so that the continuity of signals can be assured. In addition, the large-capacity data terminals 2' are enabled to transmit data of a large capacity without the influence upon the other terminals. Although signals are, in the medium speed continuous signal terminals 3', transmitted every time to a specific time slot of each of the frames, the large capacity data terminals 2' include a frame in which no signal is transmitted to the time slot. In a case where the transmission speed is insufficient, there is a case in which a terminal transmits signals to a plurality of time slots.

When an I/F control MPU (Micro Processor Unit) 85 receives a demand of transmission of a signal from the large-capacity data terminals 2' or the medium speed continuous signals 3, it notifies the time slot number to be used and the destination of the signal to each of the terminals which are connected to the network through the CSMA/CD control circuit 81, this notification being conducted through the encoder/decoder 82 and the O/E. E/O circuit 83 by using wavelength $\lambda_1$.

At this time, even if the notification of the use of the time slot of the same number is intended to be made by the other terminal, either of the terminals is arranged to make the notification since the transmission passage through which wavelength $\lambda_1$ passes has been multiplexed by the CSMA/CD. As a result, the terminal which has early made the notification is allowed to use the time slot. Furthermore, since the use of the time slot is notified each of the terminals, each of the terminals can always recognize the state of use of the time slot so that it can select the empty time slot.

When the notification about the use of the time slot has been made to each of the terminals from the I/F control MPU 85 and also the terminal which had been specified as the destination has prepared for the signal receipt, a TDMA control circuit 86 is allowed to transmit a signal by the I/F control MPU 85. As a result, data compressed in the time axis direction is transmitted to the network with the specified time slot after data has been caused to be an optical signal of wavelength of $\lambda_2$ by the encoder/decoder 87 and the O/E. E/O circuit 88. The signal-receipt terminal takes out the signal from the specified time slot in the processed arranged reversely to the above-described process.

FIG. 6C is a block diagram for the communication interface 73 which can preferably correspond to the high speed continuous signal terminal 4'. The high speed continuous signal terminal 4' may treat a signal such as a video signal of 600 Mbps which has been formed by digitizing a precise video signal. According to this embodiment, two optical signals having wavelengths $\lambda_3$ and $\lambda_4$ respectively are prepared for transmitting the high speed video signal. Therefore, the signal is transmitted from the terminal after either of the two optical signals has been selected. The optical signal having wavelength $\lambda_3$ or $\lambda_4$ is used exclusively by the terminal during the transmission of the signal where the simultaneous transmission of a plurality of the high speed continuous signals with the same wavelength is prevented.

When the I/F control MPU 85 of the communication interface 73 receives a demand of signal transmission from the high speed continuous signal terminal 4', it notifies the use of wavelength $\lambda_3$ or $\lambda_4$ and the destination of the signal to each of the terminals via the CSMA/CD control circuit 81. The destination of the terminal which has been allowed to use the wavelength and the recognition of the empty wavelength are conducted similarly to the operation described about the communication interface 72 which corresponds to the large capacity data terminal 2' and the medium speed continuous signal terminal 3' shown in FIG. 6B.

After the notification about the use of wavelength $\lambda_3$ or $\lambda_4$ in the transmission passage has been made and also the destined terminal has prepared for the signal reception, the I/F control MPU 85 issues a permission of the transmission of a signal to a buffer 90. As a result, the high speed continuous signal is converted into a transmission passage code by an encoder/decoder 91. The thus obtained transmission passage code is then input, by a switch 92, from the I/F control MPU 85 to the E/O. O/E circuit 93 or 94 having the specified wavelength so that the thus input transmission passage code is made the optical signal having wavelength $\lambda_3$ or $\lambda_4$ so as to be transmitted to the network via the multiplexer 84. The signal-receipt terminal receives the signal having the specified wavelength in the reversed process to the above-described process.

Figure 6D:
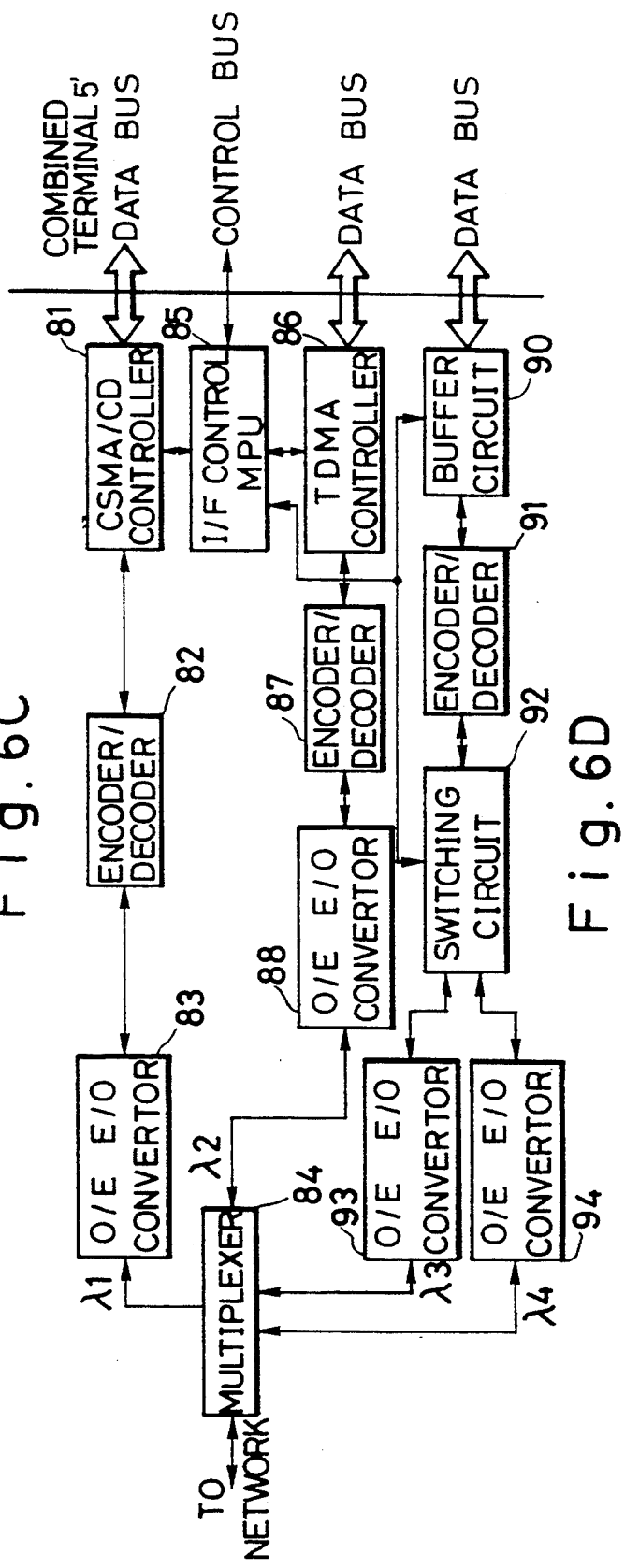
Figure 7:
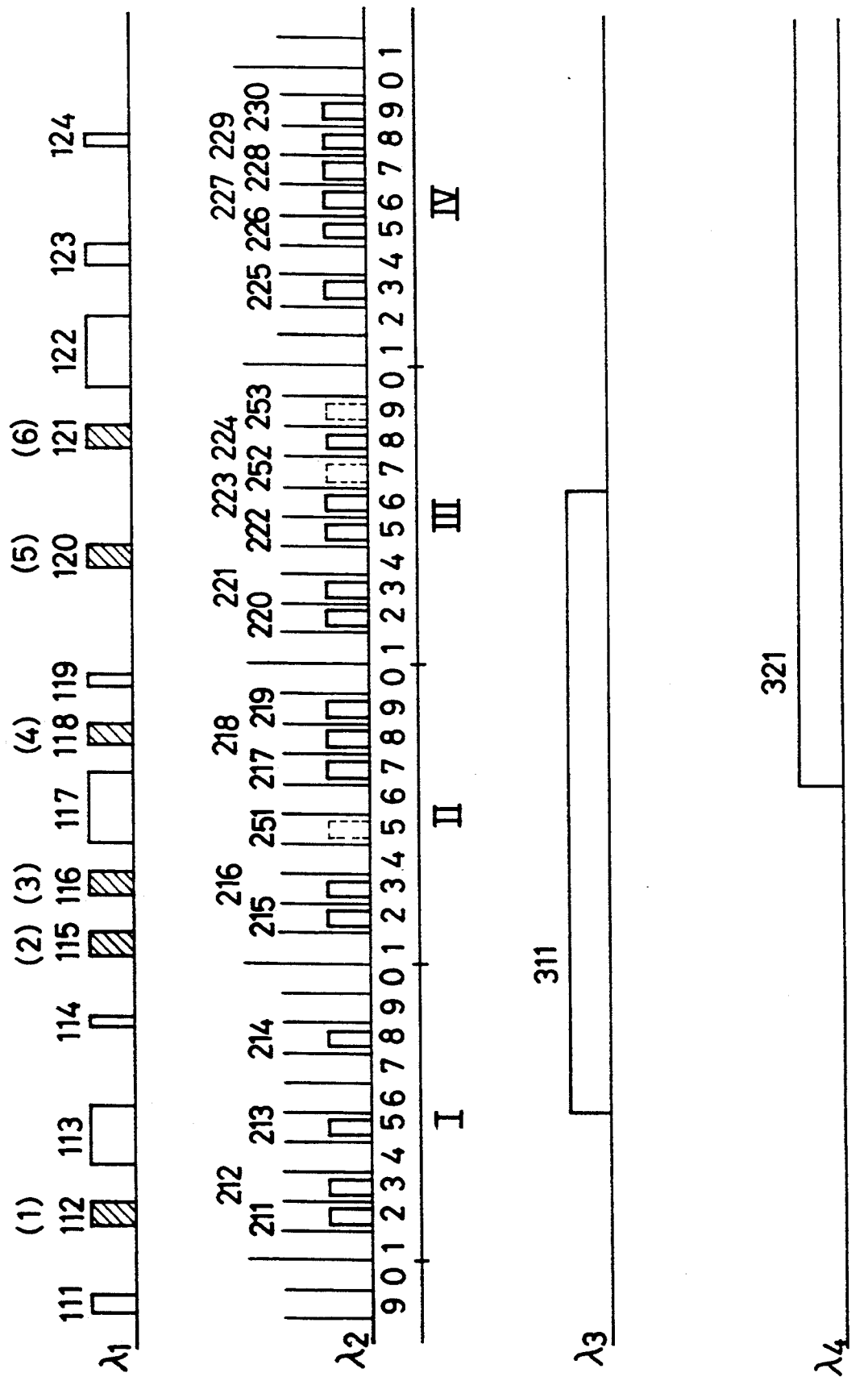
FIG. 7 is a time chart which illustrates an example of the operation of the structure shown in FIG. 5.

FIG. 6D is block diagram for the communication interface 74 which can preferably correspond to the combined terminal 5 arranged to treat the data signal, medium speed continuous signal, and the high speed continuous signal. That is, the structure is arranged so as to have a function of transmitting and receiving wavelengths $\lambda_1$, $\lambda_2$, $\lambda_3$, and $\lambda_4$ as described with reference to FIGS. 6A to 6C. Furthermore, the I/F control MPU 85 transmits/receives the signal through each of the processes described with reference to FIGS. 6A to 6C.

FIG. 7 is a time chart which illustrates an example of the operation of the optical fiber network according to this embodiment, where $\lambda_1$, $\lambda_2$, $\lambda_3$, and $\lambda_4$ represent optical lengths. As described above, wavelength $\lambda_1$ is multiplexed by a method in accordance with IEEE802, 3, while $\lambda_2$ is multiplexed on the time axis by method in accordance with the TDMA method. Referring to the drawing, the rectangle represents the transmission of the optical signal.

In the description about the transmission by using wavelength $\lambda_1$, rectangles represented by reference numerals 111 and 113 without no diagonal lines represent packets of a data signal between the data terminals, while rectangles with diagonal lines represent packets for use in the notification of the use of the transmission passage by using the wavelengths $\lambda_2$, $\lambda_3$, and $\lambda_4$. In the description about the transmission by using wavelength $\lambda_2$, regions numbered from 0 to 9 represent time slots, while regions numbered from I to IV represent the periods of the time slots. Rectangles 211 and 212 represent signals introduced into the time slots. Rectangles 251 and 252 with diagonal lines represent a fact that there is no signal in the time slots. In the description about the transmission using wavelengths $\lambda_3$ and $\lambda_4$, rectangles 311 and 321 represent the high speed continuous signals.

In the initial stage of the state shown in FIG. 7, that is, in the left-end state as viewed in the same drawing, a communication is optionally conducted with wavelength $\lambda_1$, while the time slots numbered 2, 3, 5, 8 are used with wavelength $\lambda_2$. Furthermore, wavelengths $\lambda_3$ an $\lambda_4$ are not used. Then, the communication procedure will be successively described in accordance with the sequential order of the packets numbered from (1) to (6) after the state described above.

(1) The notification of use to each of the terminals and specification of the destination are made by a packet 112 with wavelength $\lambda_3$ or $\lambda_4$ prior to the start of the communication by a first high speed continuous signal terminal $4'_{-1}$. Then, a communication 311 is started by using wavelength $\lambda_3$.

(2) A first large-capacity data terminal $2'_{-1}$ notifies, with wavelength $\lambda_2$, the specified time slots 7 and 9 other than the time slots 2, 3, 5, and 8 which are being used and it notifies the specified destination. It then transmits 217,219, 252, 253, 228, and 230 by using the time slots 7 and 9 after period II of the time slot. However, no signal is transmitted in 252 and 253.

(3) Since a second high speed continuous signal terminal $4'_{-2}$ has recognized, by the packet 112, a fact that wavelength $\lambda_3$ had been used by the first high speed continuous signal $4'_{-1}$, it notifies a fact that a communication will be made by using wavelength $\lambda_4$ to each of the terminals by using a packet 116. As a result, the second high speed continuous signal terminal $4'_{-2}$ starts a communication 321 with wavelength $\lambda_4$.

(4) A first medium speed continuous signal $3'_{-1}$ selects, for example, a time slot 6 from time slots other than time slots 2, 3, 5, 7, 8, and 9 which are being used with wavelength $\lambda_2$ so as to notify the specified time slot 6 and the specified destination to each of the terminals by using a packet 118 with wavelength $\lambda_1$. It then transmits 223, 227, ... by using the time slot 6 after period III of the time slot.

(5) A second medium speed continuous signal terminal $3'_{-2}$ makes an end of the communication with the time slot 2 by using wavelength $\lambda_2$. It notifies this fact to each of the terminals by using a packet 120 with wavelength $\lambda_1$. As a result, the time slot 2 from period IV is freed until any of the terminals notifies the use of it.

(6) The first high speed continuous signal terminal $4'_{-1}$ makes the communication 311 by using wavelength $\lambda_3$. It notifies this fact to each of the terminals by using a packet 121 with wavelength $\lambda_1$, causing wavelength $\lambda_3$ to be freed.

As described above and according to this embodiment, the transmission of the data signal by using the CSMA/CD is conducted with wavelength $\lambda_1$, transmission of the signal by using the TDMA system is conducted with wavelength $\lambda_2$, transmission of the high speed continuous signal by using no time-axis multiplexing is conducted by wavelengths and $\lambda_4$. Furthermore, the control of the state of the transmission of wavelengths $\lambda_1$, $\lambda_2$, $\lambda_3$, and $\lambda_4$ is conducted by the CSMA/CD communication with wavelength $\lambda_1$. As a result of the thus conducted distribution control, the high speed data transmission and cost rising can be prevented, and the communication of various signals having individual properties can be efficiently conducted, these factors being the problems which arise when a multimedia network is intended to be established.

Then, the modification of the structure of the communication interface will be described with reference to block diagrams shown in FIGS. 8A and 8B. The concept of the overall structure of the system is arranged to be the same as that shown in FIG. 5.

FIGS. 8A and 8B are views which illustrate the structure of the communication interface 72 for use to correspond to the large capacity data terminal 2' or the medium speed continuous signal terminal 3 and the communication interface 73 for use to correspond to the high speed continuous signal terminal 4', the structure being the modification to those shown in FIGS. 6B and 6C. The difference from that shown in FIGS. 6B and 6C lies in that carrier detections circuits 100, 101, and 102 are provided next to the O/E. E/O circuits 88, 93, and 94.

In the above-described structure, the state of use of each of the time slots by wavelength $\lambda_2$ and state of use of wavelengths $\lambda_3$ and $\lambda_4$ are recognized by each of the terminals due to the notification with the packet with wavelength $\lambda_1$ made by the subject terminal. The system of this type is able to work satisfactorily in a case where all of the terminals can be used at the time of starting the use of the network. However, it can be assumed that the power supply to the terminal which is not being used is stopped until it is intended to be used. Therefore, a problem arises that this terminal cannot recognize the state of use of each of the time slots and each of the wavelengths when the terminal is connected to the network.

According to this embodiment, if a novel terminal is connected to the network during the working of the network, the novel terminal can recognize the state of the use of the time slots and the wavelengths. As a result, the above-described problem can be overcome. Although the interface which can correspond to large capacity data terminals and medium speed continuous terminals and the interface which can correspond to high speed continuous terminals are described with reference to FIGS. 8A and 8B, it is apparent that the similar effect can be obtained in a case of a combined terminal by providing the similar carrier detection circuit.

Star-type optical network having no optical network control unit

Figure 9:
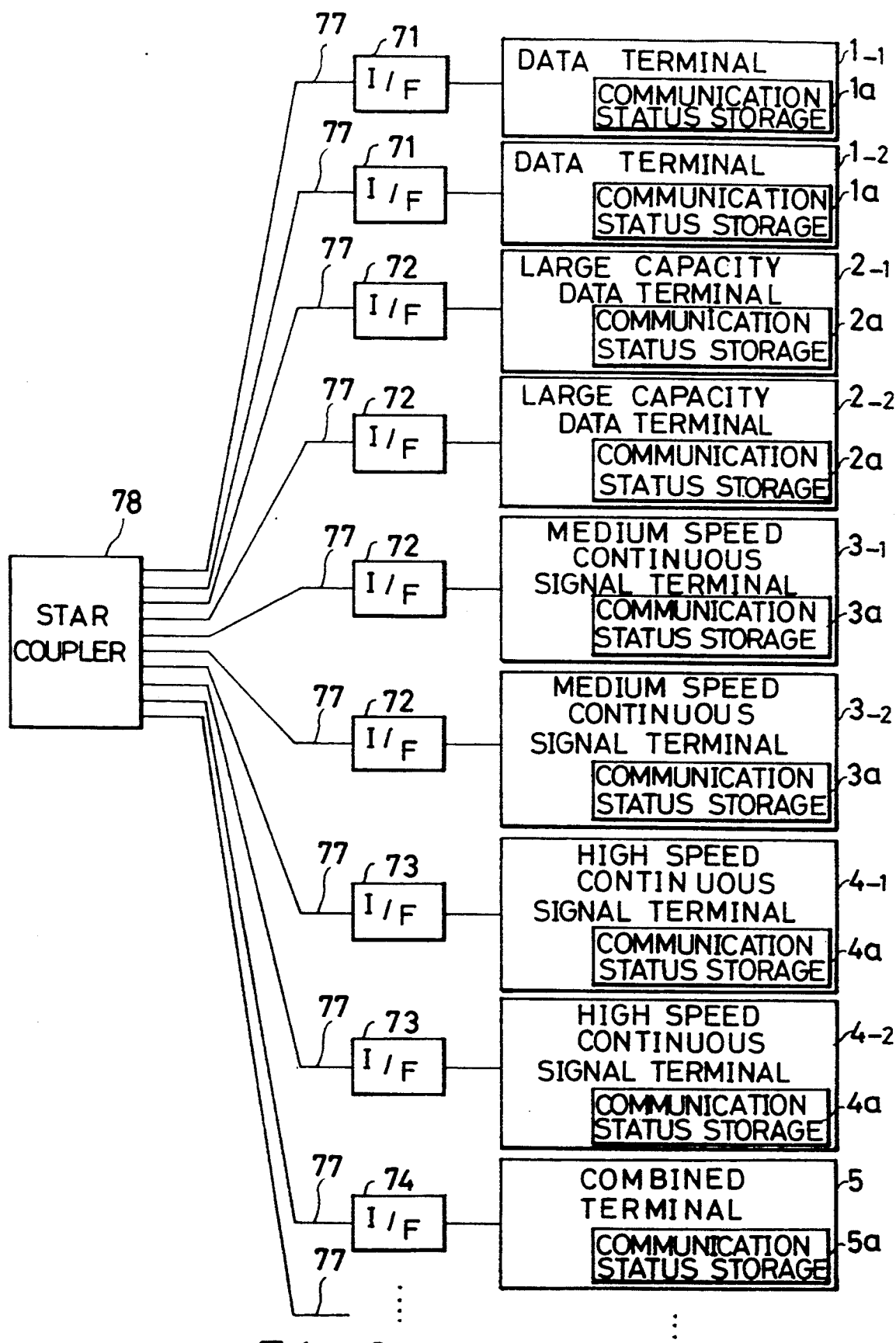
FIG. 9 is a view which illustrates the structure of a third embodiment of the multimedia optical network according to the present invention.

FIG. 9 is a schematic view of the system of a third embodiment of the optical network according to the present invention.

FIG. 9 is a view which illustrates the structure of a so-called star-type optical fiber network, where the terminals 1' to 5' and the communication interfaces 71 to 74 have the similar functions as those of the second embodiment. Reference numeral 77 represents optical fiber transmission passages, and reference numeral 78 represents a star coupler.

The star coupler 78 is capable of distributing an optical signal to all of the optical fiber transmission passages 77 when the optical signal is transmitted to any of the optical fiber transmission passages 77. In the network structured above, a multimedia optical fiber network having the similar function as that described in the second embodiment can be achieved.

The scope of the present invention is not limited to the description made about the above-described embodiments.

As for the form of the network, the description is made about the passive bus type network and the passive star type network. However, it is apparent that the present invention is effective in a so-called active star type network. Furthermore, the present invention can be applied to a structure arranged such that an amplifier is provided on the bus or in the node in the bus-type network if the wavelength can be retained and be relayed. Furthermore, an optical amplifier can be provided on the bus or in the node.

Figure 10A:
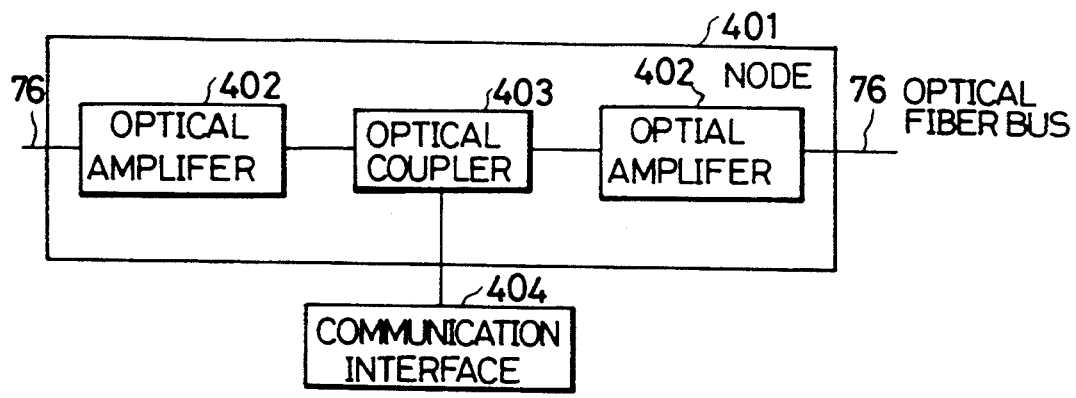
FIG. 10A is a block diagram which illustrates a structure of node having optical amplifiers in a bus type optical network.

FIG. 10A is a block diagram which illustrates a structure of node having optical amplifiers in the bus type optical network as shown in FIG. 5.

The power of optical signals transmitted on the optical fiber bus 76 is amplified by an optical amplifier 402 in a node 401 and then a part of the power is sent to a communication interface 404 through an optical coupler 403. On the other hand, the power of optical signals sent from the communication interface 404 is shared by the optical coupler 403 and then amplified by the optical amplifier 402 and transmitted on the optical fiber bus 76.

Figure 10B:
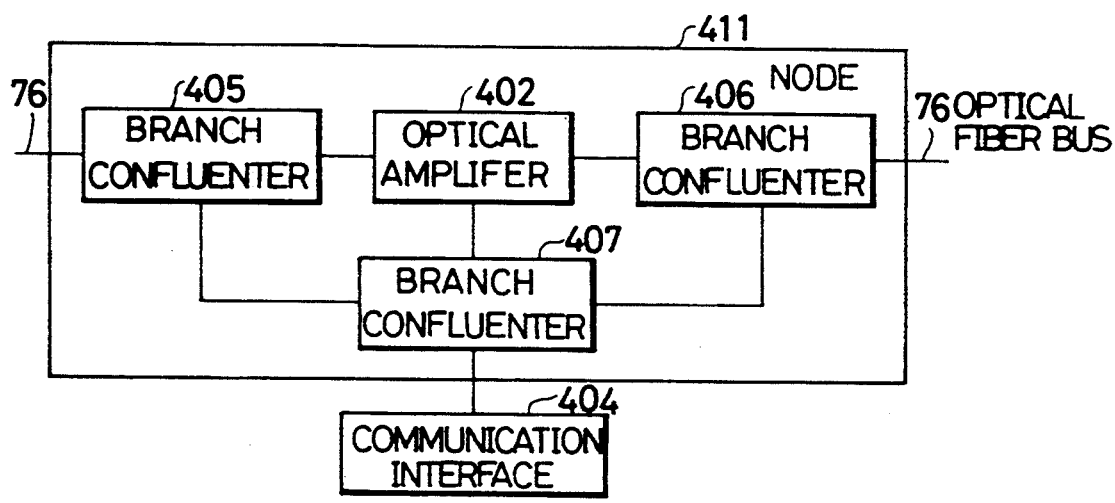
FIG. 10B is a block diagram which illustrates another structure of node having an optical amplifier in a bus type optical network.

FIG. 10B is a block diagram which illustrates another structure of node having an optical amplifier in the optical network as shown FIG. 5.

One part of the power of optical signals transmitted on the optical fiber bus 76 is branched off by a branch confluenter 405 in a node 411 and then sent to a communication interface 404 through a brance confluenter 407. Another part of the power is transmitted to next optical fiber bus through a branch confluenter 406 after amplified by an optical amplifier 402. On the other hand, the power of optical signals sent from the communication interface 404 is shared by the branch confluenter 407 and then sent to the optical fiber bus 76 through the branch confluenter 405 or 406.

Figure 11:
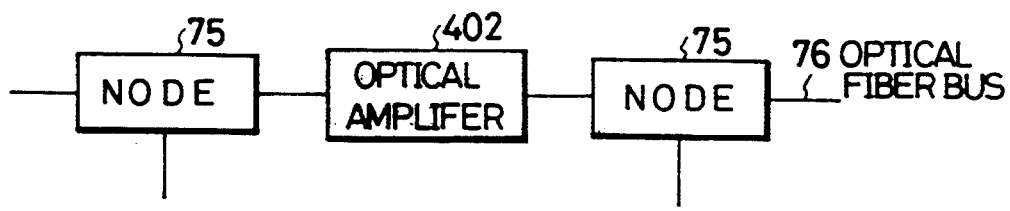
FIG. 11 is a view which illustrates the structure of a park of a bus type optical network system having an optical amplifier between nodes.

FIG. 11 is a view which illustrates the structure of a part of the bus type optical network having an optical amplifier between nodes, in the optical network as shown in FIG. 5.

In above embodiments, it becomes possible to compensate an attenuation of the power of optical signals which occurs in the optical fiber, the optical coupler or the branch confluenter, because the optical amplifier is prepared in the node or on the bus. Therefore, the optical fiber network having increased number of nodes is realized.

The present invention is not limited to the above-described multiplexing method in which wavelength $\lambda_1$ is applied to the CSMA/CD according to IEEE802, 3 and wavelength $\lambda_1$ is applied to the TDMA method with the transmission speed 40 Mbps and the degree of multiplexing 10. Furthermore, the high speed continuous signal is described with reference to an example in which the signal of 60 Mbps is multiplexed by two wavelengths $\lambda_3$ and $\lambda_4$. The present invention is not limited to the above-described signal speed and the number of the multiplexings. The digital audio devices and video devices shown in the above-described embodiments serves only examples of the terminals. Any type of the terminal can replace these terminals if the signal speed or the continuity is the same.

Furthermore, al though the terminals and the communication interfaces are separated from one another according to this embodiment, the storages 1a to 5a for storing the state of the communication may be included in the communication interfaces since they needs to be integrated naturally.

As described above and according to the present invention, the signal transmission speed can be reduced on a multimedia optical network in which a signal is communicated between a plurality of terminals each of which has individual transmission speed, transmission capacity and continuity. Furthermore, the cost of the terminal arranged to have a low transmission speed can be reduced. In addition, the network control unit can be eliminated. As a result, a high performance network capable of corresponding to various multimedia, displaying extensibility can be provided with a low cost.

It is to be understood that the form of my invention herein shown and described is to be taken as a preferred example of the same and that various changes in the shape, size and arrangement of parts may be resorted to without departing from the spirit of my invention or the scope of the subjoined claims.

What is claimed is:

1. A data terminal, connected to an optical fiber network, for conducting a circuit switching communication via said optical fiber, comprising:
    first communication means for conducting a packet switching communication with another data terminal using a first optical wavelength;
    second communication means for conducting the circuit switching communication with another data terminal using a second optical wavelength:
    storage means for storing a state of the circuit switching communication using said second optical wavelength; and
    control means for controlling the circuit switching communication of said second communication means in accordance with a content of said storage means.

2. A data terminal according to claim 1, wherein said control means comprises detection means to detect a carrier on said optical fiber.

3. A data terminal according to claim 1, wherein said data terminal is connected to said optical fiber with an optical coupler.

4. A data terminal according to claim 1, wherein said first and second optical wavelengths are multiplexed by wavelength division multiplexing on said optical fiber.

5. A data terminal according to claim 1, wherein said second communication means conducts the circuit switching communication of continuous signals.

6. A data terminal according to claim 1, wherein said second communication means conducts the circuit switching communication of time division multiplexing signals.

7. An optical fiber communication method in an optical network established by connecting a plurality of types of data terminals with an optical fiber, said optical fiber communication method comprising the steps of:
    allotting a first optical wavelength to a packet switching communication between said data terminals;
    allotting a second optical wavelength to a circuit switching communication between said data terminals;
    storing states of said circuit switching communication using said second optical wavelength; and
    controlling said circuit switching communication using said second optical wavelength, on the basis of said stored states of said circuit switching communication.

8. An optical fiber communication method according to claim 7, wherein said data terminals are respectively connected to said optical fiber with an optical coupler.

9. An optical fiber communication method according to claim 7, wherein said optical fiber has an optical amplifier to amplify optical signals.

10. An optical fiber communication method according to claim 7, wherein said optical network is a star type network in which said data terminals are connected with a star coupler.

11. An optical fiber communication method according to claim 7, wherein said optical network is a bus type network which connects said data terminals to an optical fiber bus.

12. An optical fiber communication method according to claim 7, wherein said first and second optical wavelengths are multiplexed by a wavelength division multiplexing on said optical fiber.

13. An optical fiber communication method according to claim 7, wherein in said controlling step said circuit switching communication of continuous signals is controlled.

14. An optical fiber communication method according to claim 7, wherein in said controlling step said circuit switching communication of time division multiplexing signals is controlled.

15. A data terminal, connected to an optical fiber of an optical fiber network, for conducting a circuit switching communication via said optical fiber, comprising:
- first communication means for conducting a packet switching communication with another data terminal using a first optical wavelength;
- second communication means for conducting the circuit switching communication with another data terminal using a second optical wavelength; and
- control means for controlling the circuit switching communication of said second communication means in accordance with a state of the circuit switching communication.

16. A data terminal according to claim 15, wherein said control means comprises detection means to detect a carrier on said optical fiber.

17. A data terminal according to claim 15, wherein said data terminal is connected to said optical fiber with an optical coupler.

18. A data terminal according to claim 15, wherein said first and second optical wavelengths are multiplexed by a wavelength division multiplexing on said optical fiber.

19. A data terminal according to claim 15, wherein said second communication means conducts the circuit switching communication of continuous signals.

20. A data terminal according to claim 15, wherein said second communication means conducts the circuit switching communication of time division multiplexing signals.

21. An optical fiber communication method in an optical network established by connecting a plurality of types of data terminals with an optical fiber, said optical fiber communication method comprising the steps of:
- allotting a first optical wavelength to a packet switching communication between said data terminals;
- allotting a second optical wavelength to a circuit switching communication between said data terminals; and
- controlling said circuit switching communication using said second optical wavelength on the basis of a state of said circuit switching communication.

22. An optical fiber communication method according to claim 21, wherein said data terminals are respectively connected to said optical fiber with an optical coupler.

23. An optical fiber communication method according to claim 21, wherein said optical fiber has an optical amplifier to amplify optical signals.

24. An optical fiber communication method according to claim 21, wherein said optical network is a star type network in which said data terminals are connected with a star coupler.

25. An optical fiber communication method according to claim 21, wherein said optical network is a bus type network which connects said data terminals to an optical fiber bus.

26. An optical fiber communication method according to claim 21, wherein said first and second optical wavelengths are multiplexed by a wavelength division multiplexing on said optical fiber.

27. An optical fiber communication method according to claim 21, wherein in said controlling step, said circuit switching communication of continuous signals is controlled.

28. An optical fiber communication method according to claim 21, wherein in said controlling step, said circuit switching communication of time division multiplexing signals is controlled.

29. A data terminal, connected to an optical fiber network, for conducting a circuit switching communication via said optical fiber, comprising:
- first communication means for conducting a time division multiplexing communication with another data terminal using a first optical wavelength;
- second communication means for conducting the circuit switching communication with another data terminal using a second optical wavelength;
- storage means for storing a state of the circuit switching communication using said second optical wavelength; and
- control means for controlling the circuit switching communication of said second communication means in accordance with a content of said storage means.

30. A data terminal according to claim 29, wherein said control means comprises detection means for detecting a carrier on said optical fiber.

31. A data terminal according to claim 29, wherein said data terminal is connected to said optical fiber with an optical coupler.

32. A data terminal according to claim 29, wherein said first and second optical wavelengths are multiplexed by wavelength division multiplexing on said optical fiber.

33. A data terminal according to claim 29, wherein said second communication means conducts the circuit switching communication of continuous signals.

34. An optical fiber communication method in an optical network established by connecting a plurality of types of data terminals with an optical fiber, said optical fiber communication method comprising the steps of:
- allotting a first optical wavelength to a time division multiplexing communication between said data terminals;
- allotting a second optical wavelength to a circuit switching communication between said data terminals;
- storing states of said circuit switching communication using said second optical wavelength; and
- controlling said circuit switching communication using said second optical wavelength on the basis of said stored states of said circuit switching communication.

35. An optical fiber communication method according to claim 34, wherein said data terminals are respectively connected to said optical fiber with an optical coupler.

36. An optical fiber communication method according to claim 34, wherein said optical fiber has an optical amplifier to amplify optical signals.

37. An optical fiber communication method according to claim 34, wherein said optical network is a star type network in which said data terminals are connected with a star coupler.

38. An optical fiber communication method according to claim 34, wherein said optical network is a bus type network which connects said data terminals to an optical fiber bus.

39. An optical fiber communication method according to claim 34, wherein said first and second optical wavelengths are multiplexed by a wavelength division multiplexing on said optical fiber.

40. An optical fiber communication method according to claim 34, wherein in said controlling step, said circuit switching communication of continuous signals is controlled.

41. A data terminal connected to an optical fiber of an optical fiber network, for conducting a circuit switching communication via said optical fiber, comprising:
first communication means for conducting a time division multiplexing communication with another data terminal using a first optical wavelength;
second communication means for conducting the circuit switching communication with another data terminal using a second optical wavelength; and
control means for controlling the circuit switching communication of said second communication means in accordance with a state of the circuit switching communication.

42. A data terminal according to claim 41, wherein said data terminal is connected to said optical fiber with an optical coupler.

43. A data terminal according to claim 42, wherein said first and second optical wavelengths are multiplexed by a wavelength division multiplexing on said optical fiber.

44. A data terminal according to claim 42, wherein said second communication means conducts the circuit switching communication of continuous signals.

45. A data terminal according to claim 42, wherein said control means comprises detection means to detect a carrier on said optical fiber.

46. An optical fiber communication method in an optical network established by connecting a plurality of types of data terminals with an optical fiber, said optical fiber communication method comprising the steps of:
allotting a first optical wavelength to a time division multiplexing communication between said data terminals;
allotting a second optical wavelength to a circuit switching communication between said data terminals; and
controlling said circuit switching communication using said second optical wavelength on the basis of a state of said circuit switching communication.

47. An optical fiber communication method according to claim 46, wherein said data terminals are respectively connected to said optical fiber with an optical coupler.

48. An optical fiber communication method according to claim 46, wherein said optical fiber has an optical amplifier to amplify optical signals.

49. An optical fiber communication method according to claim 46, wherein said optical network is a star type network in which said data terminals are connected with a star coupler.

50. An optical fiber communication method according to claim 46, wherein said optical network is a bus type network which connects said data terminals to an optical fiber bus.

51. An optical fiber communication method according to claim 46, wherein said first and second optical wavelengths are multiplexed by a wavelength division multiplexing on said optical fiber.

52. An optical fiber communication method according to claim 46, wherein in said controlling step, said circuit switching communication of continuous signals is controlled.

53. A data terminal connected to an optical fiber network, for conducting a circuit switching communication via an optical fiber, comprising:
first communication means for conducting a packet switching communication with another data terminal using a first optical wavelength;
second communication means for controlling a time division multiplexing communication with another data terminal using a second optical wavelength;
third communication means for conducting the circuit switching communication with another data terminal using a third optical wavelength;
storage means for storing a state of the circuit switching communication using said third optical wavelength; and
control means for controlling the circuit switching communication of said third communication means in accordance with a content of said storage means.

54. A data terminal according to claim 53, wherein said control means comprises detection means for detecting a carrier on said optical fiber.

55. A data terminal according to claim 53, wherein said data terminal is connected to said optical fiber with an optical coupler.

56. A data terminal according to claim 53, wherein said first, second and third optical wavelengths are multiplexed by wavelength division multiplexing on said optical fiber.

57. A data terminal according to claim 53, wherein said third communication means conducts the circuit switching communication of continuous signals.

58. An optical fiber communication method in an optical network established by connecting a plurality of types of data terminals with an optical fiber, said optical fiber communication method comprising the steps of:
allotting a first optical wavelength to a packet switching communication between said data terminals;
allotting a second optical wavelength to a time division multiplexing communication between said data terminals;
allotting a third optical wavelength to a circuit switching communication between said data terminals;
storing states of said circuit switching communication using said third optical wavelength; and
controlling said circuit switching communication using said third optical wavelength on the basis of said stored states of said circuit switching communication.

59. An optical fiber communication method according to claim 58, wherein said data terminals are respectively connected to said optical fiber with an optical coupler.

60. An optical fiber communication method according to claim 58, wherein said optical fiber has an optical amplifier to amplify optical signals.

61. An optical fiber communication method according to claim 58, wherein said optical network is a star type network in which said data terminals are connected with a star coupler.

62. An optical fiber communication method according to claim 58, wherein said optical network is a bus type network which connects said data terminals to an optical fiber bus.

63. An optical fiber communication method according to claim 58, wherein said first, second and third optical wavelengths are multiplexed by wavelength division multiplexing on said optical fiber.

64. An optical fiber communication method according to claim 58, wherein in said controlling step, the circuit switching communication of continuous signals is controlled.

65. A data terminal, connected to an optical fiber of an optical fiber network, for conducting a circuit switching communication via said optical fiber, comprising:

first communication means for conducting a packet switching communication with another data terminal using a first optical wavelength;

second communication means for conducting a time division multiplexing communication with another data terminal using a second optical wavelength;

third communication means for conducting the circuit switching communication with another data terminal using a third optical wavelength; and control means for controlling the circuit switching communication of said third communication means in accordance with a state of the circuit switching communication.

66. A data terminal according to claim 65, wherein said data terminal is connected to said optical fiber with an optical coupler.

67. A data terminal according to claim 65, wherein said first, second and third optical wavelengths are multiplexed by wavelength division multiplexing on said optical fiber.

68. A data terminal according to claim 65, wherein said third communication means conducts the circuit switching communication of continuous signals.

69. A data terminal according to claim 65, wherein said control means comprises detection means for detecting a carrier on said optical fiber.

70. An optical fiber communication method in an optical network established by connecting a plurality of types of data terminals with an optical fiber, said optical fiber communication method comprising the steps of:

allotting a first optical wavelength to a packet switching communication between said data terminals;

allotting a second optical wavelength to a time division multiplexing communication between said data terminals;

allotting a third optical wavelength to a circuit switching communication between said data terminals; and controlling said circuit switching communication using said third optical wavelength on the basis of a state of said circuit switching communication.

71. An optical fiber communication method according to claim 70, wherein said data terminals are respectively connected to said optical fiber with an optical coupler.

72. An optical fiber communication method according to claim 70, wherein said optical fiber has an optical amplifier to amplify optical signals.

73. An optical fiber communication method according to claim 70, wherein said optical network is a star type network in which said data terminals are connected with a star coupler.

74. An optical fiber communication method according to claim 70, wherein said optical network is a bus type network which connects said data terminals to an optical fiber bus.

75. An optical fiber communication method according to claim 70, wherein said first, second and third optical wavelengths are multiplexed by wavelength division multiplexing on said optical fiber.

76. An optical fiber communication method according to claim 70, wherein in said controlling step, said circuit switching communication of continuous signals is controlled.

* * * * *

UNITED STATES PATENT AND TRADEMARK OFFICE
CERTIFICATE OF CORRECTION

PATENT NO. : 5,343,314

DATED : August 30, 1994

INVENTORS : Nakamura et al.

Page 1 of 4

It is certified that error appears in the above-identified patent and that said Letters Patent is hereby corrected as shown below:

ON TITLE PAGE

In [57] ABSTRACT,
Line 3, "rality-of" should read --rality of--,
Line 5, "system, being" should read --system-- and
Line 13, "optical," should read --optical--.

IN THE DRAWINGS

Figure 6A, Sheet 6 of 11:
    "TEPMINAL 1'" should read --TERMINAL 1'--,

Figure 6B, Sheet 6 of 11:
    "MIDIUM" should read --MEDIUM-- and

Figure 8A, Sheet 9 of 11:
    "MIDIUM" should read --MEDIUM--.

COLUMN 1

Line 16, "arts" should read --art--.
Line 25, "the" should be deleted.

COLUMN 3

Line 62, "an" should read --a--.

UNITED STATES PATENT AND TRADEMARK OFFICE
CERTIFICATE OF CORRECTION

PATENT NO. : 5,343,314

DATED : August 30, 1994

INVENTORS : Nakamura et al.

It is certified that error appears in the above-identified patent and that said Letters Patent is hereby corrected as shown below:

COLUMN 4

Line 17, "FIG. 1; FIG." should read --FIG. 1; ¶ FIG.--.

COLUMN 7

Line 45, "e" should read --be--.

COLUMN 8

Line 68, "al though" should read --although--.

COLUMN 9

Line 64, "signals" should read --signal--.

COLUMN 10

Line 13, comprises" should read --comprise--.
Line 55, "an" should read --a--.

COLUMN 11

Line 3, "an" should read --a--.
Line 41, "notified" should read --notified to--.

UNITED STATES PATENT AND TRADEMARK OFFICE
CERTIFICATE OF CORRECTION

PATENT NO. : 5,343,314

DATED : August 30, 1994

INVENTORS : Nakamura et al.

Page 3 of 4

It is certified that error appears in the above-identified patent and that said Letters Patent is hereby corrected as shown below:

COLUMN 12

Line 33, "is" should read --is a--.
Line 56, "no" should read --any--.

COLUMN 15

Line 29, "brance" should read --branch--.
Line 60, "serves only" should read --serve only as--.
Line 63, "al though" should read --although--.
Line 67, "needs" should read --need--.

COLUMN 16

Line 12, "my" should read --our--.
Line 16, "my" should read --our--.

UNITED STATES PATENT AND TRADEMARK OFFICE
CERTIFICATE OF CORRECTION

PATENT NO. : 5,343,314

DATED : August 30, 1994

INVENTORS : Nakamura et al.

It is certified that error appears in the above-identified patent and that said Letters Patent is hereby corrected as shown below:

COLUMN 16

Line 27, "wavelength:" should read --wavelength;--.

Signed and Sealed this

Twenty-fifth Day of April, 1995

Attest:

BRUCE LEHMAN

Attesting Officer

Commissioner of Patents and Trademarks